United States Patent
Chapman et al.

(10) Patent No.: US 7,651,806 B2
(45) Date of Patent: Jan. 26, 2010

(54) NON-FLAMMABLE EXHAUST ENABLER FOR HYDROGEN POWERED FUEL CELLS

(75) Inventors: Daryl Chapman, Victor, NY (US); Prem Menon, Rochester, NY (US); David A. Masten, Rochester, NY (US); Norm Dill, Walworth, NY (US); Robert Schafer, Darmstadt (DE); Daniel B. O'Connell, Victor, NY (US); Barbara S. Moore, Victor, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 992 days.

(21) Appl. No.: 10/811,204

(22) Filed: Mar. 26, 2004

(65) Prior Publication Data

US 2005/0214617 A1    Sep. 29, 2005

(51) Int. Cl.
*H01M 2/00* (2006.01)
*H01M 2/02* (2006.01)

(52) U.S. Cl. .................. 429/34; 429/13; 429/17; 429/25; 429/39

(58) Field of Classification Search .............. 429/13, 429/17, 34, 39
See application file for complete search history.

(56) References Cited

U.S. PATENT DOCUMENTS

| | | | |
|---|---|---|---|
| 5,785,298 A * | 7/1998 | Kumar | 251/129.16 |
| 6,003,363 A * | 12/1999 | Danielson et al. | 73/49.2 |
| 6,406,805 B1 * | 6/2002 | James et al. | 429/13 |
| 6,426,158 B1 * | 7/2002 | Pratt et al. | 429/13 |
| 6,916,563 B2 | 7/2005 | Yamamoto et al. | |
| 2003/0118882 A1 * | 6/2003 | Voss | 429/25 |
| 2004/0013919 A1 * | 1/2004 | Ueda et al. | 429/22 |

FOREIGN PATENT DOCUMENTS

JP    11-191422    *    7/1999    .................. 429/39

OTHER PUBLICATIONS

A. Tsukada, P. Rodatz (ETH Zürich), Efficiency Improvements by Pulsed Hyerogen Supply in Polymer Electrolyte Fuel Cell (PEFC) Systems, pp. 88-90.

* cited by examiner

*Primary Examiner*—Patrick Ryan
*Assistant Examiner*—Ben Lewis
(74) *Attorney, Agent, or Firm*—John A. Miller; Miller IP Group, PLC

(57) ABSTRACT

A fuel cell system that employs a purge valve, an accumulator and a bleed valve for selectively purging and bleeding anode exhaust gas. When the purge valve is opened, the anode exhaust gas purges to the accumulator where it is collected. The bleed valve provides a controlled release of the anode exhaust gas from the accumulator that allows the concentration of hydrogen bled from the accumulator to remain below its combustible limit. In one embodiment, the purged anode exhaust gas is combined with the cathode exhaust gas and released to atmosphere. In another embodiment, the purged anode exhaust gas is combined with a cathode input gas. In another embodiment, the purged anode exhaust gas is combined with an anode input gas.

4 Claims, 2 Drawing Sheets

NON-FLAMMABLE EXHAUST ENABLER FOR HYDROGEN POWERED FUEL CELLS

BACKGROUND OF THE INVENTION

1. Field of the Invention

This invention relates generally to a hydrogen fuel cell system and, more particularly, to a hydrogen fuel cell system that employs a purge valve for purging a combustible anode exhaust gas from the fuel cell stack, an accumulator for accumulating the purged anode exhaust gas, and a bleed valve for slowly bleeding the accumulated anode exhaust gas from the accumulator in a non-combustible manner.

2. Discussion of the Related Art

Hydrogen is a very attractive source of fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is dissociated in the anode, typically by a catalyst, to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane (PEM) type fuel cells are a popular fuel cell for vehicles. The PEM fuel cell generally includes a solid polymer electrolyte proton conducting membrane, such as a perfluorinated acid membrane. The anode and cathode typically include finely divided catalytic particles, usually platinum (Pt), supported on carbon particles and mixed with an ionomer. The combination of the anode, cathode and membrane define a membrane electrode assembly (MEA). MEAs are relatively expensive to manufacturer and require certain conditions for effective operation. These conditions include proper water management and humidification, and control of catalyst poisoning constituents, such as carbon monoxide (CO).

Many fuel cells are typically combined in a fuel cell stack to generate the desired power. The fuel cell stack receives a cathode charge gas that includes oxygen, typically a flow of forced air from a compressor, and an anode hydrogen gas. An anode exhaust gas and a cathode exhaust gas are discharged from the fuel cell stack. The anode exhaust gas is the hydrogen gas stream applied to the stack minus the hydrogen used by the stack and the cathode exhaust gas is a depleted oxygen stream. The hydrogen in the anode exhaust gas makes it relatively combustible. When the anode exhaust gas is vented to atmosphere, an increased localized hydrogen content develops around the exhaust outlet which could become a combustible mixture, thus causing a possible dangerous situation. Sometimes a pump and return pipe is employed to pump the anode exhaust gas back to the anode input so that the unused hydrogen can be recycled. In other designs, the exhaust gas streams are sent to a tail gas combustor that burns the anode exhaust gas using oxygen from air and/or the cathode exhaust gas. Both the pump design for returning the anode exhaust gas to the input and the tail gas combustor add a level of complexity to the fuel cell system that requires significant system control.

In certain fuel cell designs, lower anode stoichiometric operation is desirable for increased efficiency of the system. In a dead-ended anode design, the anode exhaust is closed off and the amount of hydrogen in the input gas is almost completely consumed by the stack. However, dead-ended anode operation requires a periodic anode purge to minimize nitrogen and water buildup in the stack. If the anode is not periodically purged, then the build up nitrogen and water in the stack would decrease performance of the stack, and eventually cause it shut down. The purged anode exhaust gas includes hydrogen that is usually vented to the atmosphere or sent to the tail gas combustor.

SUMMARY OF THE INVENTION

In accordance with the teachings of the present invention, a fuel cell system is disclosed that employs a purge valve, an accumulator and a bleed valve to selectively purge and bleed anode exhaust gas from a stack in the fuel cell for dead-ended anode operation. The purge valve is selectively opened to purge the anode exhaust gas to the accumulator where it is collected. The bleed valve provides a controlled release of the anode exhaust gas from the accumulator that allows the concentration of hydrogen bled from the accumulator to remain below its combustible limit. In one embodiment, the bled anode exhaust gas is combined with the cathode exhaust gas, and released to atmosphere. In an alternate embodiment, the bled anode exhaust gas is combined with the cathode input gas.

In another embodiment, the accumulated anode exhaust gas can be sent to the anode input to be recycled. The system can include a pump that pumps the anode exhaust gas to the anode input at the appropriate pressure. Alternately, a controller can control the stack pressure relative to the accumulator pressure so that the anode exhaust gas is appropriately delivered to the anode input.

Additional advantages and features of the present invention will become apparent from the following description and appended claims, taken in conjunction with the accompanying drawings.

DETAILED DESCRIPTION OF THE INVENTION

The following discussion of the embodiments of the invention directed to a system for purging and bleeding combustible anode exhaust gas from a stack in a fuel cell system is merely exemplary in nature, and is in no way intended to limit the invention or its applications or uses. For example, the discussion herein has particular application for a fuel cell system for a vehicle. However, the fuel cell system of the invention has other applications, including, but not limited to, stationary power modules, such as cell tower backups and shipboard power generators.

Figure 1:
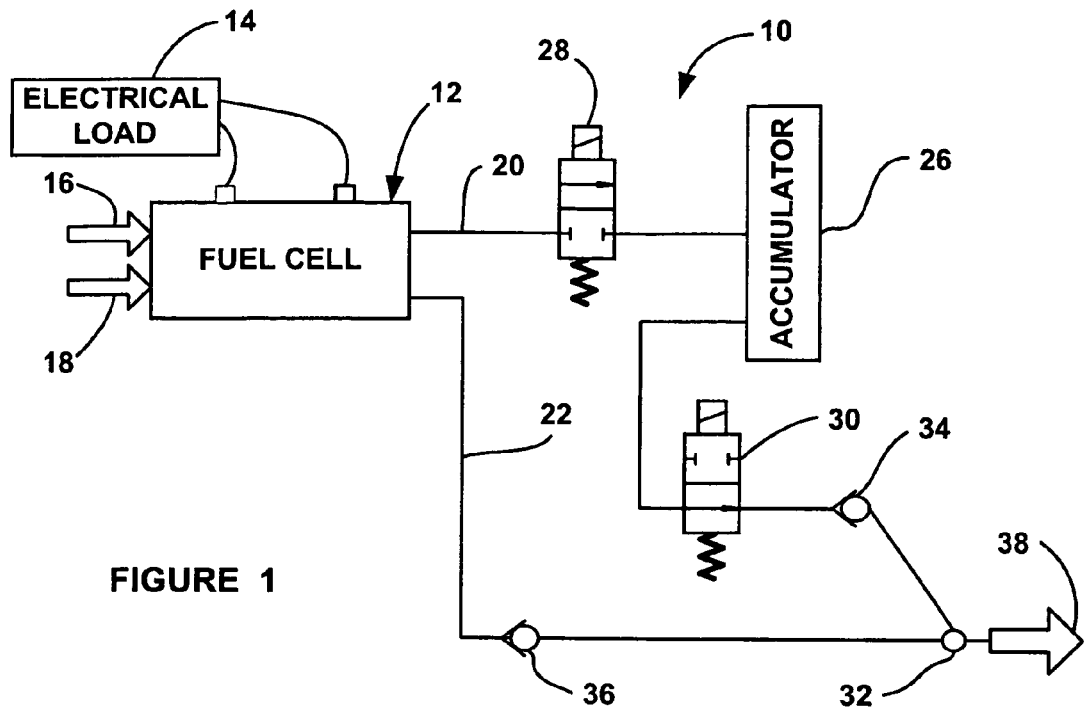
FIG. 1 is a schematic plan view of a fuel cell system employing a purge valve, an accumulator and a bleed valve for selectively collecting and bleeding anode exhaust gas from a fuel cell stack, according to an embodiment of the present invention.

FIG. 1 is a schematic plan view of a fuel cell system 10 employing a fuel cell stack 12. The fuel cell stack 12 includes a plurality of fuel cells, such as MEAs, electrically coupled in series that combine to generate electrical power to drive an electrical load 14. In one embodiment, the electrical load is the electrical load of a fuel cell vehicle. However, the system 10 of the invention can be employed in other applications besides vehicle applications, such as those referred to above. The fuel cell stack 12 receives a hydrogen-rich gas flow from a hydrogen source on an anode input line 16 to fuel the anodes in the fuel cell stack 12. The fuel cell stack 12 also receives a cathode input gas on a cathode input line 18, typically compressed air from a compressor (not shown), to fuel the cathodes in the stack 12. An anode exhaust gas is provided on an anode exhaust line 20, and a cathode exhaust gas is provided on a cathode exhaust line 22. The operation of a fuel cell stack of this type is well understood to those skilled in the art.

As discussed above, certain fuel cell systems operate by a dead-ended anode operation where the anode exhaust gas is held for some period of time in the stack 12, and then selectively purged on the output line 20. The rate of purging the anode exhaust gas typically depends on the amount of power the fuel cell stack 12 is generating. Because the anode exhaust gas includes a significant amount of hydrogen, it is relatively combustible, and thus, certain precautions need to be taken to prevent ignition of the gas. Some systems employ combustors, such as tail gas combustors, that burn the anode exhaust gas, but this adds a level of expense and complexity to the system that is sometimes undesirable.

According to the invention, the system 10 employs a technique for safely bleeding the anode exhaust gas from the fuel cell stack 12 without the need for employing a combustor. The system 10 includes an accumulator 26, such as a suitable tank, that accumulates the purged anode exhaust gas so that it can be safely bled to the environment or otherwise at relatively low non-combustible hydrogen concentrations. A purge valve 28 is coupled to the exhaust line 22. The valve 28 is selectively opened to allow the anode exhaust gas to be accumulated by the accumulator 26.

In one embodiment, the valve 28 is a spring-biased solenoid control valve, where the spring bias default position causes the valve 28 to be closed. By applying a potential to the solenoid of the valve 28, it slides against the bias of the spring so that the valve 28 is opened and the anode exhaust gas can flow into the accumulator 26. Therefore, the combustible anode exhaust gas is not released from the system 10 when it is purged from the fuel cell stack 12, but is safely contained within the accumulator 26.

According to the invention, a bleed valve 30 is coupled to the accumulator 26 to slowly and selectively bleed off the anode exhaust gas stored therein in a controlled manner. In this embodiment, the bleed valve 30 is also a spring-biased, solenoid control valve, where the default spring bias position is open. By selectively energizing the solenoid, the valve 30 is closed and then reopened so that only a minimal amount of the anode exhaust gas is bled from the accumulator 26 at any given time. By selectively controlling the amount of exhaust gas that is bled from the accumulator 26, the amount of the gas can be kept under the combustible limits of the hydrogen therein. In other words, by carefully designing the size of the bleed valve 30, the contents of the accumulator 26 can be slowly removed therefrom before the next purge cycle and still keep the hydrogen concentration below its combustible limits in the air-hydrogen mixture of the combined exhaust gas.

The size of the bleed valve 30 is based on the operating pressure and temperature of the system 10, and the required purge frequency of the stack 12. In an alternate embodiment, the bleed valve 30 can be replaced with a fixed orifice or orifices, where the amount of the anode exhaust gas bled through the orifice is continuous, but minimal. Different sized orifices can be selected for the different operating requirements of the cell stack 12. The various parameters of the system will determine the type and operation of the bleed valve 30, where the parameters are largely determined by how often it is necessary to purge the fuel cell stack 12. For vehicle applications, the purge rate of the fuel cell stack 12 will be determined by the power demands thereon. Providing a fixed orifice of a predetermined size for the bleed valve 30 would have better applications in those systems where the periodic purging of the fuel cell stack 12 was consistent, and the amount of hydrogen released during each purge was consistent. By employing the bleed valve 30, as discussed herein, the purged anode exhaust gas can be removed at non-flammable levels, and the complexities associated with a combustor can be eliminated.

The bled anode exhaust gas is sent through a check valve 34 to a mixer 32. The anode exhaust gas is mixed with the cathode exhaust gas that is also applied to the mixer 32 through a check valve 36. The amount of oxygen in the cathode exhaust gas is one of the parameters that determines how much hydrogen can be combined therewith, and still maintain the combined exhaust gas below its combustible limit. The mixture of the anode and cathode exhaust gas is then released to the environment at arrow 38 in a non-flammable mixture.

Figure 2:
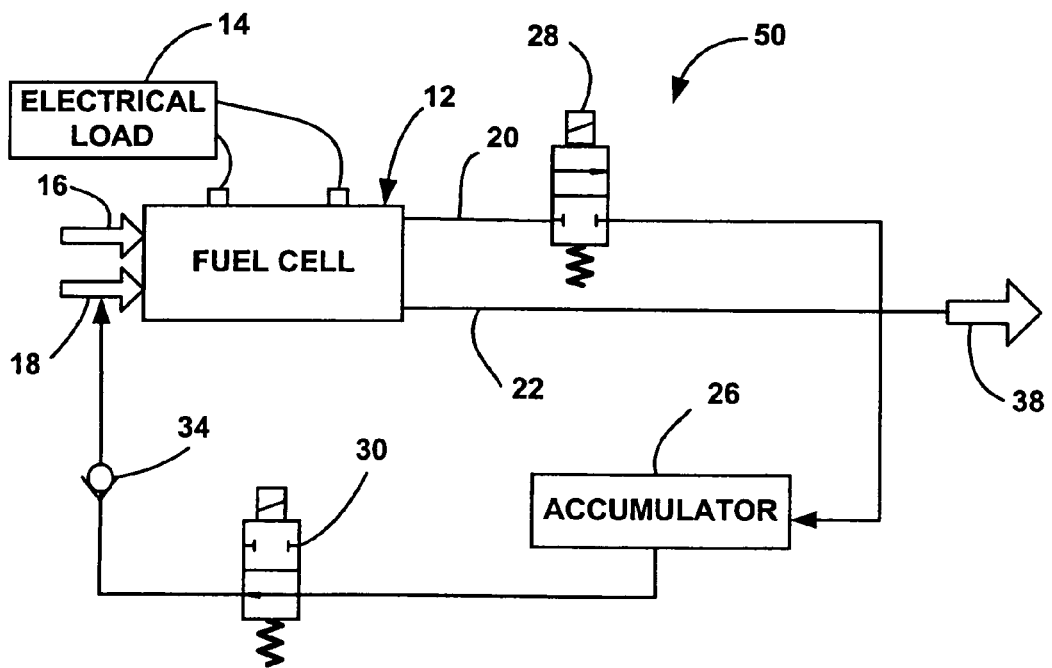
FIG. 2 is a schematic plan view of a fuel cell system employing a technique for bleeding combustible anode exhaust gas to a cathode input line, according to another embodiment of the present invention.

FIG. 2 is a schematic plan view of another fuel cell system 50 similar to the fuel cell system 10 discussed above, where like elements are identified with the same reference numeral. In this embodiment, the bled anode exhaust gas from the bleed valve 30 is not combined with the cathode exhaust gas. The cathode exhaust gas is still exhausted to the environment, but the hydrogen-rich anode exhaust gas is combined with the air input gas on the line 18. In this design, the fuel cell system 50 would have no hydrogen emissions because all of the anode exhaust gas is returned to the fuel cell stack 12. The hydrogen in the anode exhaust gas mixes with the oxygen in the air to generate water that helps humidify the membranes in the MEAs. Also, because the anode exhaust gas is heated by the operation of the stack 12, the heat from the anode exhaust gas may help to heat the stack 12 during cold starts and the like. Further, as the hydrogen and oxygen combine at the air input, heat is generated from the exothermic reaction.

Figure 3:
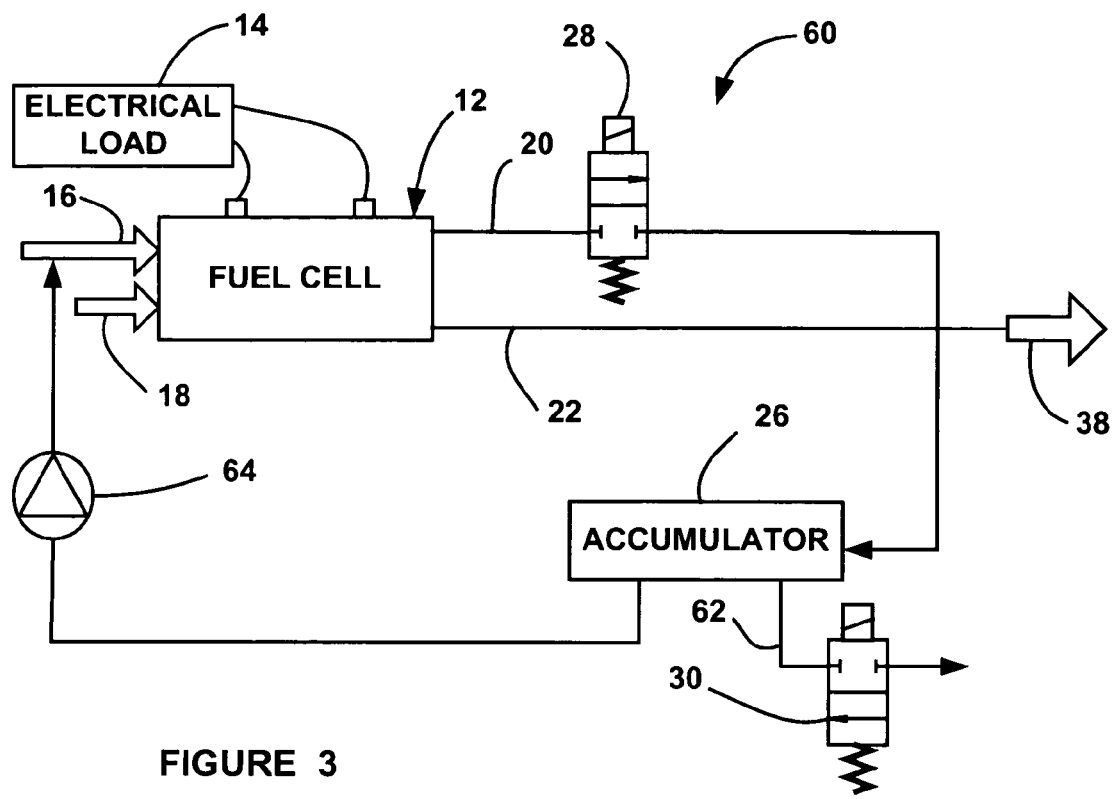
FIG. 3 is a schematic plan view of a fuel cell system employing a technique for providing combustible anode exhaust gas to an anode input line, according to another embodiment of the present invention.

FIG. 3 is a schematic plan view of another fuel cell system 60 similar to the fuel cell systems 10 and 50 discussed above, where like elements are identified with the same reference numeral. In this embodiment, the anode exhaust gas is again periodically purged to the accumulator 26 through the purge valve 28. However, some or all of the anode exhaust gas stored in the accumulator 26 is applied to the anode input line 16 to be recycled. Some of the anode exhaust gas stored in the accumulator 26 can also be bled to the environment on line 62 through the bleed valve 30. The anode exhaust gas bled from the accumulator 26 on the line 62 can be combined with the cathode exhaust gas as was done in the system 10, sent to the cathode input as was done in the system 50 or sent to a tail gas combustor (not shown).

Because the anode gas on the input line 16 needs to be applied to the fuel cell stack 12 at a certain pressure, the system 60 employs a pump 64 that pumps the exhaust gas from the accumulator 26 to the fuel cell stack 12. The pump 64 can be any pump providing gas compression suitable for the purposes described herein, such as a gas turbine. In one embodiment, a large pressure differential is necessary between the anode exhaust gas output pressure and the recycled input gas pressure.

The pump 64 can pump the anode exhaust gas from the accumulator 26 to the input line 16 in a continuous manner, in a pulse-wise manner or otherwise. The pumping of the anode exhaust gas can be provided by any suitable device or system. In one embodiment, the pressure in the accumulator 26 is reduced prior to the next time the purge valve 28 is opened. Also, these components can be integrated within the accumulator 26.

Figure 4:
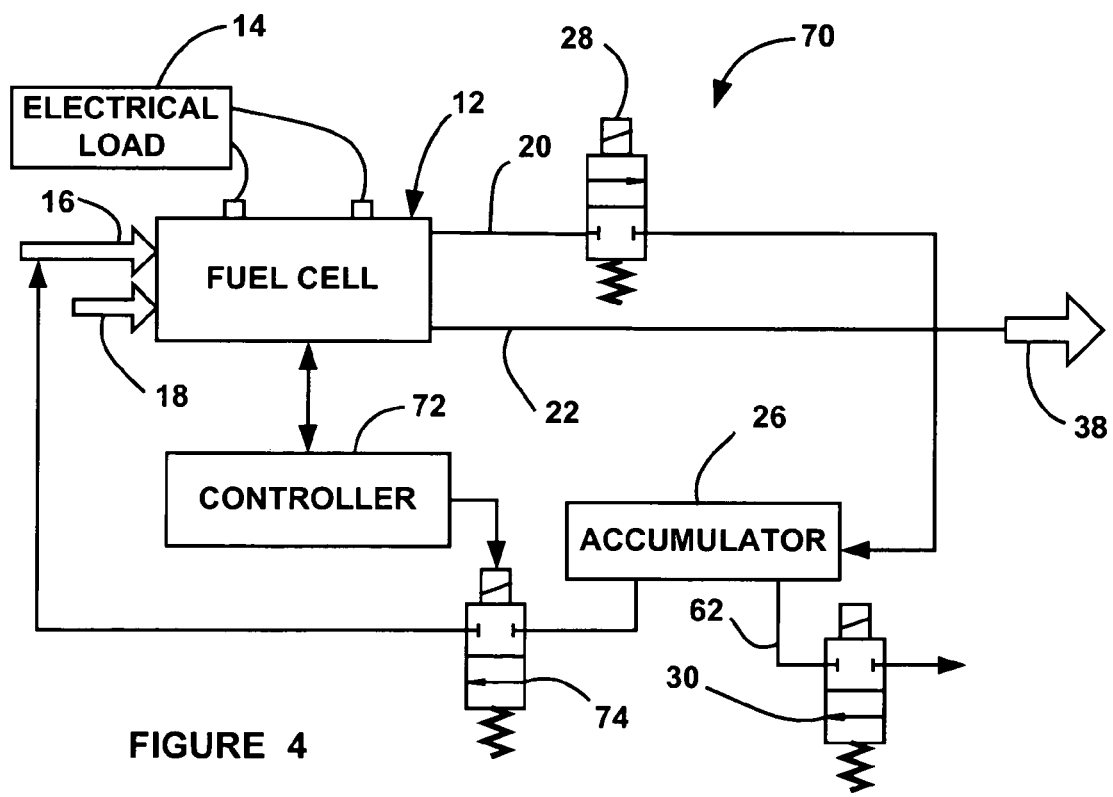
FIG. 4 is a schematic plan view of a fuel cell system employing a technique for providing combustible anode exhaust gas to an anode input line, according to another embodiment of the present invention.

FIG. 4 is a schematic plan view of another fuel cell system 70 similar to the fuel cell system 60 discussed above, where like elements are identified with the same reference numeral. In this embodiment, the anode exhaust gas accumulated by the accumulator 26 is also applied to the anode input line 16 to be recycled. However, the pump 64 is eliminated. Instead, a controller 72 is used to control the stack pressure of the fuel cell stack 12 so that the anode exhaust gas stored in the accumulator 26 flows into the fuel cell stack 12. The minimum pressure for stack operation is set to be slightly higher than the minimum achievable stack pressure as a result of design and piping. The anode exhaust gas is collected in the accumulator 26 through the purge valve 28 at this slightly higher pressure. The stack pressure is then lowered by the controller 72 to be sufficiently below the pressure within the accumulator 26. The anode exhaust gas stored in the accumulator 26 is routed directly to the anode inlet stream at the input line 16 through a valve 74 driven by this pressure difference. In one embodiment, the valve 74 is a check valve that is calibrated for the pressure difference between the stack 12 and the accumulator 26.

Alternatively, the purge valve 28 is used to recycle the accumulated gas in the accumulator 26 back into the anode exhaust when the accumulator pressure is greater than the stack pressure. This would eliminate the need for the valve 74.

The controller 72 employs a suitable algorithm that adjusts the pressure within the fuel cell stack 12 based on the pressure within the accumulator 26. The algorithm will know the pressure in the accumulator 26 because it will know the duty cycle of the purge valve 28. The control algorithm monitors the pressure within the accumulator 26 and adjusts the stack pressure to be below the accumulator pressure to empty the accumulator 26. Additionally, during transient operation, the stack 12 often exhausts at high pressure, and the stack steps down the pressure of operation almost instantly due to a design requirement for lower pressure. In this case, the process would naturally lend itself to recycle the anode exhaust gas at high pressure (during a burp at high pressure) to the stack anode inlet at low pressure (after down transient).

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
a fuel cell stack, said fuel cell stack receiving a cathode input gas and a hydrogen anode input gas, said fuel cell stack exhausting a cathode exhaust gas on a cathode exhaust gas line and an anode exhaust gas on an anode exhaust gas line;
a purge valve coupled to the anode exhaust gas line for selectively purging the anode exhaust gas;
an accumulator coupled to the anode exhaust gas line, said accumulator accumulating the purged anode exhaust gas from the purge valve; and
a bleed valve for selectively bleeding the anode exhaust gas accumulated in the accumulator, wherein the bled anode exhaust gas from the bleed valve is combined with the cathode exhaust gas in the cathode exhaust gas line, said bleed valve being at least one fixed orifice that allows the anode exhaust gas to be bled from the accumulator in a continuous manner where the rate that the anode exhaust gas is bled from the accumulator is less than the rate that the anode exhaust gas is purged into the accumulator through the purge valve.

2. The system according to claim 1 wherein the combined anode and cathode exhaust gas is exhausted to the environment.

3. The system according to claim 1 wherein the purge valve is a spring-biased, solenoid controlled valve.

4. The system according to claim 1 wherein the at least one fixed orifice is a plurality of fixed orifices.

* * * * *